United States Patent [19]

Miyawaki

[11] Patent Number: 4,799,750

[45] Date of Patent: Jan. 24, 1989

[54] OPTICAL FUNCTION ELEMENT AND A METHOD FOR MANUFACTURING THE SAME

[75] Inventor: Mamoru Miyawaki, Tokyo, Japan

[73] Assignee: Canon Kabushiki Kaisha, Tokyo, Japan

[21] Appl. No.: 667,165

[22] Filed: Nov. 1, 1984

[30] Foreign Application Priority Data

Nov. 4, 1983 [JP] Japan .................................. 58-207773
Jan. 23, 1984 [JP] Japan .................................. 59-010507
Jan. 23, 1984 [JP] Japan .................................. 59-010508

[51] Int. Cl.$^4$ .............................................. G02B 6/10
[52] U.S. Cl. .............................. 350/96.13; 350/96.11; 350/96.14
[58] Field of Search ............... 350/96.12, 96.13, 96.14; 300/96.14

[56] References Cited

U.S. PATENT DOCUMENTS

| | | | |
|---|---|---|---|
| 3,874,782 | 4/1975 | Schmidt | 350/96.13 |
| 4,037,005 | 7/1977 | Phillips | 350/96.12 |
| 4,048,591 | 9/1977 | Auracher | 350/96.14 X |
| 4,439,004 | 3/1984 | Hunsperger et al. | 350/96.14 X |
| 4,439,265 | 3/1984 | Alferness et al. | 350/96.12 |

OTHER PUBLICATIONS

Technical Digest, Third International Conference on Integrated Optics and Optical Fiber Communication, Apr. 27-29, 1981, San Francisco, Calif.
Guided-Wave Acoustooptic Bragg Modulators for Wide-Band Integrated Optic Communications and Signal Process, IEEE Transactions on Circuits and Systems, vol. CAS-26, No. 12, Dec. 1979.
"Tunable Acousto-Optic TE-TM Mode Convertor on a Diffused Optical Waveguide" by Binh et al., Optics letters, vol. 5, No. 3, Mar. 1980.
"Thichnes Dependence of Acousto-Optic Diffraction Efficiency in Zno-Film Optical Waveguides" by Applied Physics Letter, vol. 26, No. 7, Apr. 1975.
"Sputtered Ferroelectric Thin-Film Electro-Optic Modulator" by Russo Appl. Phys. Lett, vol. 23, No. 5, Sep. 1, 1973.
"Efficient Modulation & Coupling of CW Junction Laser Light using Electrooptic Waveguides" by Hammer et al., proceedings of the IEEE, vol. 63, No. 2, Feb. 1975.

Primary Examiner—William L. Sikes
Assistant Examiner—Akm E. Ullah
Attorney, Agent, or Firm—Fitzpatrick, Cella, Harper & Scinto

[57] ABSTRACT

An optical function element constructed with a substrate, an optical waveguide formed by an ion-exchange process on the surface of the substrate, except for one region thereof, and an element to effect either modulation or deflection of light propagating in the optical waveguide. The modulating or deflecting element is provided at a region on the surface of the substrate where no ion-exchange process has been effected, and functions to vary the refractive index of the optical waveguide by external action. Also disclosed is a method for fabricating such optical function element, wherein a mask is formed on one region of the surface of a substrate made of either lithium niobate crystal or lithium tantalate crystal, then an ion-exchange process is effected on the surface of the substrate with the mask formed thereon to inject protons into the substrate at a region where no mask is formed, and finally electrodes are formed on the region of the substrate covered with the mask.

23 Claims, 5 Drawing Sheets

OPTICAL FUNCTION ELEMENT AND A METHOD FOR MANUFACTURING THE SAME

BACKGROUND OF THE INVENTION

1. Field of the Invention

This invention relates to an optical function element utilizing a thin film optical waveguide, and also to a method for manufacturing such optical function element.

2. Description of the Prior Art

Heretofore, research activities have been conducted in full swing as to applying a thin film type optical element using an optical waveguide to various devices such as light deflector, light modulator, spectrum analyzer, correlator, optical switch, and so forth. Such thin film type optical element functions to vary a refractive index of the optical waveguide by an external action such as acousto-optic effect, electro-optical effect, and so on, thereby modulating or deflecting light propagating in and through this optical waveguide. For the substrate to be used when forming the abovementioned optical element, there have been widely used lithium niobate ($LiNbO_3$) crystal and lithium tantalate ($LiTaO_3$) crystal, which are excellent in their piezoelectricity, acousto-optical effect, and electro-optical effect, and have less light propagation loss.

As a representative method of manufacturing the thin film optical waveguide using the abovementioned crystal substrate, there has been known one, in which titanium (Ti) is thermally diffused at a high temperature on the surface of the abovementioned crystal substrate to thereby form on the surface of this crystal substrate an optical waveguide layer having a refractive index which is slightly greater than that of the substrate. The thin film optical waveguide fabricated by this method, however, has various disadvantages such that it is liable to undergo optical damage, and can introduce into the waveguide path only a very small power of light. By the way, the term "optical damage" as used throughout this specification is meant "a phenomenon, in which, when the intensity of light to be input into the optical waveguide is made gradually increased, the intensity of light which propagates in and through the optical waveguide and is then taken outside becomes no longer increased owing to its scattering in proportion to the input light intensity".

As a method for fabricating the improved optical waveguide which is less liable to optical damage, there has been known one, in which the crystal substrate of $LiNbO_3$ or $LiTaO_3$ is heat-treated at a high temperature to diffuse lithium oxide ($Li_2O$) outside of the crystal substrate, thereby forming in the vicinity of the surface of the substrate a vacant interstitial layer of lithium (Li) having a refractive index slightly larger than that of the substrate.

R. L. Holman and P. J. Cressman disclose in IOC, 90, 28 April 1981 that, by the above-described external diffusion of $Li_2O$, a threshold value of the optical damage becomes higher than that attained by the internal diffusion of Ti. Incidentally, when the light deflector and the light modulator are to be realized in utilization of the acousto-optical effect or the electro-optical effect, an increase in efficiency of each of the abovementioned effects constitutes an important factor in the formation of the element. As a representative example of utilizing the acousto-optical effect, there is a method, in which a high frequency electric field is applied to comb-shaped electrodes formed by the photo-lithographic technique on the optical waveguide to cause elastic surface waves to be excited on the optical waveguide. It has been known, in this case, that the interaction between the elastic surface waves excited on the light waveguide and the guided light propagating in and through the optical waveguide increases as the energy distribution of guided light is confined in the vicinity of the substrate surface. (cf. C. S. Tsai, "IEEE Transaction on circuits and Systems", Vol. CAS-26, 12, 1979)

From the standpoint of the maximum utilization of the abovementioned interaction, the thickness of the optical waveguide layer (Li vacant interstitial layer) to be formed by the above-described $Li_2O$ external diffusion method has a small change in its refractive index, on account of which the layer needs to be made as thick as 10 to 100 $\mu m$ or so, which is not favorable, because the energy distribution of the guided light spreads in the thickness direction of the layer. In the case of, therefore, utilizing the thin film optical waveguide as fabricated by the afore-described $Li_2O$ external diffusion method for the light deflector, etc., it was difficult to realize a high efficiency in the resulting device.

On the other hand, as another method of fabricating the improved thin film optical waveguide with less optical damage, there has been known an ion-exchange method. In this method, the crystal substrate of $LiNbO_3$ or $LiTaO_3$ is subjected to a low temperature heat-treatment in a dissolved salt of tallium nitrate ($TlNO_3$), silver nitrate ($AgNO_3$), potassium nitrate ($KNO_3$), and so forth, or in a weak acid such as benzoic acid ($C_6H_5COOH$), etc. to exchange lithium ion ($Li^+$) in the crystal substrate for an ion species in the weak acid, such as proton ($H^+$), etc., thereby forming the optical waveguide layer having a large difference in the refractive index ($\Delta h \sim 0.12$).

While the thin film optical waveguide fabricated by the above-described ion-exchange method has an improved characteristic in its threshold value of the optical damage which is as high as several tens of times that of the thin film optical waveguide obtained by the titanium diffusion, it has a problem that the piezoelectricity and the electro-optical characteristic proper to the crystals of $LiNbO_3$ and $LiTaO_3$ become poor by the ion-exchange process, with the consequence that, when it is used for the light deflector, for example, the guided light inevitably lowers its diffraction efficiency.

SUMMARY OF THE INVENTION

In view of the above-described disadvantages inherent in the known arts, it is the primary object of the present invention to provide an optical function element having a sufficiently high threshold value of its optical damage, and which is capable of performing efficient light modulation or deflection.

It is another object of the present invention to provide an improved method of fabricating such optical function element.

The objects of the present invention can be achieved by the optical function element which is constructed with a substrate; an optical waveguide formed on the surface of the substrate, except for one region thereof, by the ion-exchange process; and means provided on the region of the substrate surface where no ion-exchange process has been effected, and which modulates or deflects light propagating in and through the optical waveguide by varying the refractive index of the optical waveguide through an external action.

DETAILED DESCRIPTION OF THE PREFERRED EMBODIMENTS

In the following, the present invention will be described in detail with reference to the preferred embodiments thereof shown in the drawing.

Figure 1:
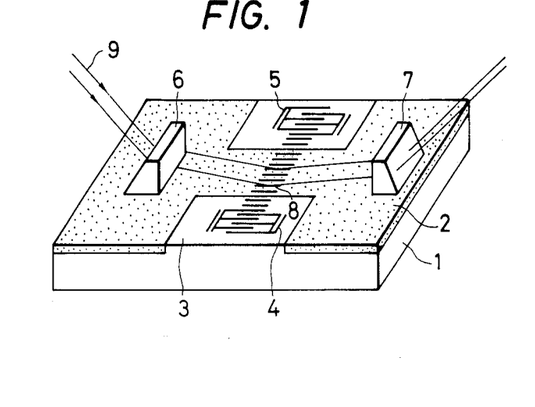
FIGS. 1 through 4 are perspective views showing preferred embodiments of the optical function element according to the present invention.

FIG. 1 illustrates a light deflector as the first embodiment of the optical function element according to the present invention. In the drawing, a reference numeral 1 designates a crystal substrate; a numeral 2 refers to an ion-exchanged section to form the optical waveguide; 3 indicates a non-ion-exchanged section; 4 a comb-shaped electrode at the emission side; 5 a comb-shaped electrode at the receiving side; 6 an input prism optical coupler; and 7 an output prism optical coupler. As shown in FIG. 1, the thin film optical waveguide type light deflector according to this embodiment is characterized by its having at the non-ion-exchanged section thereof the comb-shaped electrodes which function to generate or receive the elastic surface waves.

In the following, detailed explanations will be given as to the method for fabricating the light deflector of this particular embodiment.

On a surface (for example, x+ surface) of $LiNbO_3$ crystal of an X-plate (having a thickness of 1 mm in the direction of x, and a length of 1 inch in the respective directions of z and y) was polished to a degree of flatness of a few or less Newton rings, after which ordinary ultra-sonic cleaning was done by use of methanol, acetone, and pure water, followed by drying the surface by blowing nitrogen gas against it.

Subsequently, an aluminum plate 1 mm thick and in the shape of the region 2 of the substrate to be subjected to the ion-exchange process was placed on the $LiNbO_3$ substrate, and then chromium (Cr) and aluminum (Al) were vapor-deposited thereon to the respective thicknesses of 50 angstroms and 1,450 angstroms. For the substrate, there may also be used $LiTaO_3$, whereby thin films of chromium and aluminum as the mask for the ion-exchange process were formed on the portion where the comb-shaped electrodes are to be formed.

Next, the ion-exchange process was effected to the crystal substrate with the above-mentioned mask formed thereon. The ion-exchange process was done by placing 80 g of benzoic acid ($C_6H_5COO$) in a quartz beaker of 100 cc capacity, positioning the crystal substrate with mask in the beaker with the surface thereof having the mask facing upside, then hermetically sealing the beaker with aluminum foil, and then placing the beaker and its contents in a heating furnace to be held for 15 minutes at a temperature of 250 degrees C. In this case, in place of benzoic acid, there may be used weak acids such as palmitic acid [$CH_3(CH_2)_{14}COOH$], stearic acid [$CH_3(CH_2)_{16}COOH$], and so forth, and dissolved salts such as $AgNO_3$, $TlNO_3$, $TlSO_4$, $KNO_3$, and others.

Following the abovementioned heat-treatment, the substrate was taken outside by use of a quartz tool for holding the substrate, and washed with ethanol and then acetone. With these solvents, the benzoic acid crystals adhered onto the substrate can be easily dissolved.

After the washing, the protective mask of chromium and aluminum for the ion-exchange process was removed by use of an etching solution.

In order to find out the characteristic of the optical waveguide fabricated in the above-described manner, an He-Ne laser beam having a wavelength of 6328 angstroms was introduced by a rutile prism into the waveguide surface thereof in the direction of y to measure the light propagation loss. As a result, a value of 1.5 dB/cm was obtained. Also, the obtained threshold value of the optical damage was very high, which was as high as 10 mW/mm with the He-Ne light.

After the measurement, the optical waveguide was washed and dried once again, after which a positive photo-resist was coated thereon by a spinner to a thickness of 1 to 1.5 μm, and then contact exposure was effected thereon by use of the negative mask of the comb-shaped electrodes, followed by development of the same in a manner not to leave the comb-shaped electrode section alone therein. After the washing, it was dried and loaded in a vacuum deposition device which was evacuated to the vacuum degree of $1 \times 10^{-6}$ Torr, and then aluminum was deposited by the electron beam deposition to a film thickness of 1,500 λ. Following the vapor-deposition, the waveguide was immersed in acetone for several minutes, thereby removing the aluminum film on the photo-resist by lifting-off, and forming the comb-shaped electrode portion alone on the optical waveguide. In this case, the comb-shaped electrode is so designed that the principal wavelength of the elastic surface waves may be 600 Hz. For this reason, the width of the comb-shaped electrodes and the space interval between the electrodes were both set at 1.45 μm. In this way, the comb-shaped electrodes were provided at the non-ion-exchanged section, and the thin film optical waveguide type light deflector was thus fabricated.

On the other hand, the same comb-shaped electrodes as mentioned above were provided on the optical waveguide, which was obtained by subjecting the entire surface of the substrate to the ion-exchange process as mentioned in the foregoing, but without providing the protective mask for the ion-exchange process. Using this optical waveguide and that of the present invention, comparison was made as to the diffracting efficiency of the guided light. As shown in FIG. 1, for the incident light 9 to be projected on both optical waveguides, use was made of an He-Ne laser having a wavelength of 6328 angstroms, and a radio frequency power of 0.6W was applied to the comb-shaped electrode 4 at the emission side. The incident light 9 was converted by the input prism light coupler 6 into the guided light, was diffracted by the elastic surface waves 8 excited from the comb-shaped electrode 4 at the emission side. The diffracted light is emitted from the output prism light coupler 7. On the other hand, the elastic surface waves 8 are received into the comb-shaped electrode 5 at the receiving side positioned in confrontation to the comb-shaped electrode at the emission side, whereby the insertion loss of the elastic surface waves can be measured. The diffracting efficiency, when the comb-shaped electrodes are provided at the non-ion-exchanged portion of the substrate as in the present invention, is 60%, while, when they are provided at the ion-exchanged portion, is 0.5%. When the comb-shaped electrodes are provided at the non-ion-exchanged portion of the substrate in the present invention, the value of the insertion loss of the elastic surface waves is 17 dB, while, when they are provided at the ion-exchanged portion, the value is 40 dB. From the foregoing results, it has been found that, when the comb-shaped electrodes are provided at the ion-exchanged portion, the conversion ratio to the elastic surface waves decreases by reduced piezoelectricity of the crystal owing to the ion-exchange process, whereby the diffracting efficiency of the guided light decreases.

As has been explained in the foregoing, the light deflector in this particular embodiment has a high threshold value of optical damage, and a high diffracting efficiency of guided light.

In the fabrication of the light deflector in the above-described embodiment of the present invention, the protective mask for the ion-exchange process is once peeled off after the ion-exchange process, and then the comb-shaped electrodes are formed again on this ion-exchanged portion. In order, however, to reduce the number of process steps, such comb-shaped electrodes may be fabricated by use of the protective masking material for the above-mentioned ion-exchange process.

Figure 2:
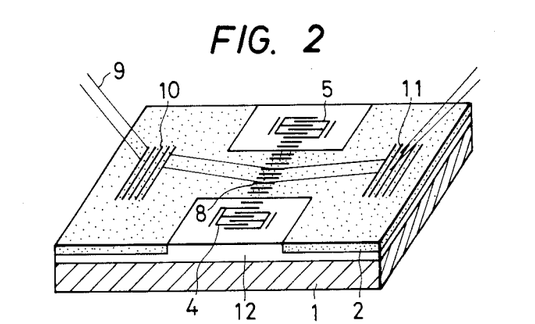

In the following, a second embodiment of the optical function element according to the present invention will be explained in reference to FIG. 2. In this figure of drawing, it should be noted, those parts identical with those in FIG. 1 are designated by the same reference numerals. In FIG. 2, a reference numeral 1 designates a crystal substrate; a numeral 2 refers to an ion-exchanged section; 4 denotes a comb-shaped electrode at the emission side; 5 represents a comb-shaped electrode at the receiving side; 10 an input diffraction grating type light coupler; 11 an output diffraction grating type light coupler; and 12 an external diffusion layer of $Li_2O$ (lithium oxide).

A point of difference in this second embodiment from the first embodiment is that the $Li_2O$ external diffusion layer 12 is interposed between the ion-exchanged layer 2 and the substrate 1, and the comb-shaped electrodes are formed on this $Li_2O$ external diffusion layer.

As stated in the foregoing, the method of forming the optical waveguide by means of the $Li_2O$ external diffusion and the ion-exchange is disclosed in detail in Japanese patent application No. 202470/1982, and this second embodiment of the present invention has a greater advantage than the first embodiment in that an optical waveguide of low propagation loss can be obtained. In manufacturing the light deflector of the second embodiment, the following process steps are followed after cleaning of the substrate. The abovementioned cleaned and dried substrate was erected on a molten quartz holder, and placed in a thermal diffusion furnace at 1,000 degrees C. Dried oxygen ($O_2$) as the atmospheric gas was introduced into the diffusion furnace at a flow rate of 2 lit/min. The furnace temperature was raised from a room temperature to 1,000 degrees C at a rate of 16 C/min. When the temperature in the furnace became constant one hour after the temperature elevation, the furnace was held at the temperature of 1,000 degrees C for eight hours, and, thereafter, the substrate was moved successively into the second heat diffusion furnace held at 600 degrees C. After this, the electric conduction to the second diffusion furnace was stopped, and the furnace was left to cool from 600 degrees C. to room temperature. After the $Li_2O$ external diffusion treatment, the same process steps as in the first embodiment were followed in sequence, i.e., fabrication of the protective mask for the ion-exchange process, ion-exchange processing, cleaning, etching of the mask, and formation of the comb-shaped electrodes.

The thus fabricated optical waveguide was examined for its characteristics by introducing a He-Ne laser beam having a wavelength of 6328 angstroms into the waveguide surface in its y direction by means of a rutile prism, and measuring its light propagation loss. A value of 1.0 dB/cm was obtained. The measured value of the diffracting efficiency was 60% which was the same as that of the first embodiment.

In the following, a third embodiment of the optical function element according to the present invention will be explained in reference to FIG. 3.

Figure 3:
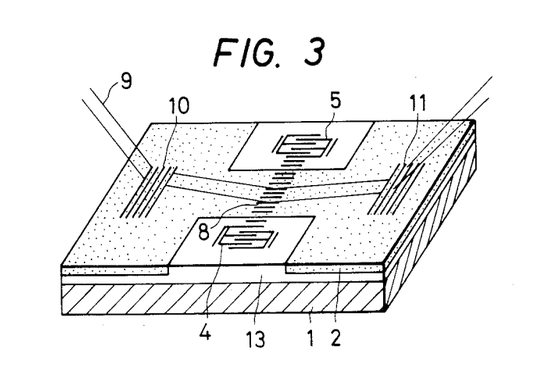

In FIG. 3, a reference numeral 13 designates a titanium (Ti) diffusion layer. The other parts are exactly the same as those in the second embodiment, hence they are designated by the same reference numerals as in the previous embodiment.

The method of forming the optical waveguide by the titanium diffusion and the ion-exchange process is disclosed in Optical Communication 42 (1982) 101 by M. DeMicheli, J. Botineau, P. Sibillot, D. B. Ostrowsky, and M. Papuchon.

This third embodiment of the present invention has an advantage in that an optical waveguide with lower propagation loss than those in the first and second embodiments can be obtained. In the manufacture of the light deflector according to the third embodiment of the present invention, the following process steps were carried out after the cleaning of the substrate. That is to say, a thin film of titanium having a film thickness of 200 angstroms was formed on the dried surface of the substrate by the electron beam deposition. Subsequently, the substrate was erected on a molten quartz holder, and then it was set in a thermal diffusion furnace at 965 degrees C. Dried oxygen ($O_2$) gas was introduced into the diffusion furnace as the atmospheric gas at a rate of 1 lit/min. The temperature in the furnace was raised from room temperature to 965 degrees C at a rate of 16 degrees C/min. When the furnace temperature became constant one hour after the temperature elevation, the holder was maintained at 965 degrees C for 2.5 hours. Thereafter, it was successively moved to the second heat diffusion furnace, kept at 600 degrees C. Then, the electric conduction to the second diffusion furnace was stopped, and the furnace was left to cool from 600 degrees C back to room temperature. After the thermal diffusion treatment of titanium, the same procedures as in the first embodiment were followed sequentially, i.e., fabrication of the protective mask for the ion-exchange processing, ion-exchange processing, cleaning, etching of the masking material, and formation of the comb-shaped electrodes. In order to examine the characteristics of the thus fabricated optical waveguide, an He-Ne laser beam having a wavelength of 6328 angstroms was introduced by a rutile prism into the waveguide surface in its y direction to measure the light propagation loss. A value of 0.2 dB/cm was obtained. The threshold value of the optical damage was as high a value as 15 mW/mm in spite of its having the titanium diffusion layer. On the other hand, the measured value of the diffracting efficiency was 70%, which is higher than that in the first and second embodiments.

Figure 4:
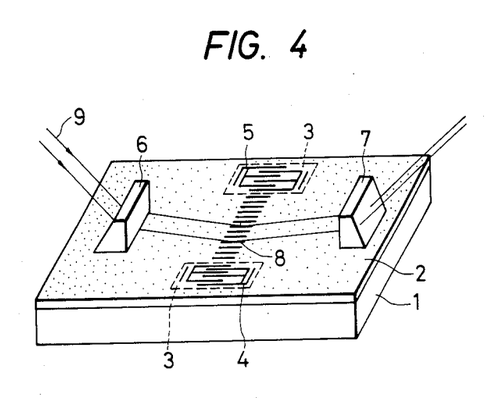

FIG. 4 illustrates a light deflector as a fourth embodiment of the optical function element according to the present invention, in which parts identical with those in FIG. 1 are designated by the same reference numerals, and the detailed explanations thereof are dispensed with. In FIG. 4, the non-ion-exchanged section 3 indicates, for the sake of convenience, a predetermined region including the neighboring area of the comb-shaped electrodes 4 and 5. In reality, however, such non-ion-exchanged section is present only beneath these electrodes. That is to say, this fourth embodiment provides the comb-shaped electrodes at a portion where no ion-exchange processing has been effected. The point of difference from the first embodiment is that this non-ion-exchanged portion is only the portion covered by the electrodes.

Figure 5A:
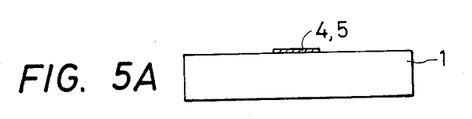
FIGS. 5A and 5B are schematic cross-sections showing one example of a fabricating process of the optical function element of the embodiment shown in FIG. 4.
Figure 5B:
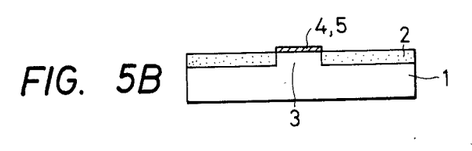

In the following, detailed explanations will be given with reference to FIGS. 5A and 5B as to the method for fabrication the light deflector of this fourth embodiment.

One surface (for example x+surface) of $LiNbO_3$ crystal of an X-plate (having a thickness of 1 mm in the direction of x, and a length of 1 inch in the respective directions of z and y) was polished to a degree of flatness of a few or less Newton rings, after which ordinary ultra-sonic cleaning was done by use of methanol acetone, and pure water, followed by drying the surface by blowing nitrogen gas against it.

Subsequently, a positive photo-resist was coated thereon by a spinner to a thickness of 1 to 1.5 $\mu$m, and then contact exposure was effected thereon by use of a negative mask of the comb -shaped electrodes, followed by development of the same in a manner not to leave the comb-shaped electrode portion alone. After the washing, it was dried and loaded on a vacuum deposition device which was evacuated to the vacuum degree of $1 \times 10^{-6}$ Torr, and then aluminum was deposited by the electron beam deposition to a film thickness of 1,500 $\lambda$. Following the vapor-deposition, it was immersed in acetone for several minutes, thereby removing the aluminum film on the photo-resist by lifting-off, and forming the comb-shaped electrodes 4 and 5 alone on the crystal substrate 1 as shown in FIG. 5A. For the electrode material, Au, Ti, Cr, etc. may be used, besides Al. In this case, the comb-shaped electrode is so designed that the principal wavelength of the elastic surface waves may become 600 Hz. For this reason, the width of the comb-shaped electrode and the space interval between the electrodes were both set at 1.45 $\mu$m.

In the next place, the ion-exchange process was effected to the crystal substrate with the abovementioned mask. The ion-exchange process was done by placing 80 g of benzoic acid ($C_6H_5COOH$) in a quartz beaker of 100 cc capacity, positioning the crystal substrate with the mask in the beaker with its surface having the mask facing upward, then hermetically sealing the beaker with aluminum foil, and then placing the beaker and its contents in a heating furnace to be held for 15 minutes at a temperature of 250 degrees C. In this case, there may be used, in place of benzoic acid, those weak acids and dissolved salts as exemplified in the foregoing first embodiment.

Following the abovementioned heat-treatment, the substrate was taken outside by use of a quartz tool for holding the substrate to be cleaned with ethanol and then acetone. With these solvents, the benzoic acid crystals adhered onto the substrate can be easily dissolved. In this manner, the ion-exchanged section 2 to be the optical waveguide is formed on the crystal substrate 1, while the non-ion-exchanged section is situated only beneath the comb-shaped electrodes 4 and 5.

The thus fabricated light waveguide was examined for its characteristics by introducing He-Ne laser beam having a wavelength of 6328 angstroms into the waveguide surface in its y direction by means of a rutile prism, and measuring its light propagation loss. A value of 1.5 dB/cm was obtained. The threshold value of the optical damage was as high as 10 mW/mm with an He-Ne laser beam. Also, under the same conditions as in the foregoing first embodiment, the diffracting efficiency was measured. A value as high as 60% was obtained. The insertion loss of the elastic surface waves showed a value of 17 dB/cm.

Figure 6:
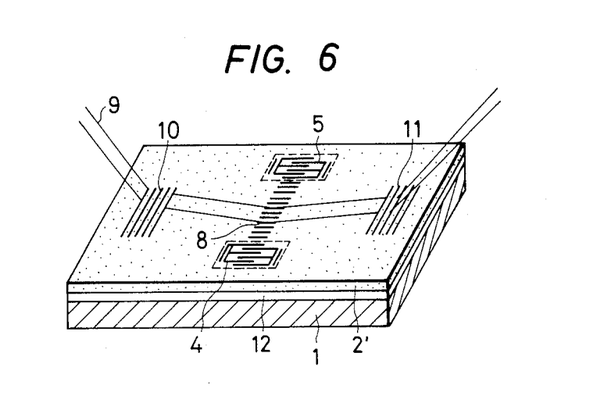
FIGS. 6 to 9 are perspective views showing other embodiments of the optical function element according to the present invention.

FIG. 6 illustrates a fifth embodiment of the present invention, which is a further improvement in the aforedescribed fourth embodiment. It should be noted that in this figure of drawing, the identical parts identical as to those in FIG. 4 are designated by the same reference numerals.

In the drawing, a reference numeral 1 designates a crystal substrate of $LiNbO_3$, a numeral 2' refers to an ion-exchanged section, a numeral 4 indicates a comb-shaped electrode at the emission side, a numeral 5 represents a comb-shaped electrode at the receiving side, 10 indicates an input diffraction grating light coupler, 11 an output diffraction grating type light coupler, and 12 an external diffusion layer of lithium oxide ($Li_2O$).

A point of difference in this fifth embodiment from the embodiment shown in FIG. 4 is that the external diffusion layer of $Li_2O$ is interposed between the ion-exchanged layer and the substrate, and that the comb-shaped electrodes are formed on the $Li_2O$ external diffusion layer. On account of this structure, the light function element of this particular embodiment has its advantage of low propagation loss.

In the manufacture of this light deflector, the following process steps were followed after cleaning of the substrate. After the substrate was cleaned and dried, it was erected on a molten quartz holder, and then set in a heat diffusion furnace kept at 1,000 degrees C. Dried oxygen ($O_2$) as the atmospheric gas was introduced into the diffusion furnace at a flow rate of 2 lit/min. The furnace temperature was raised from room temperature to 1,000 degrees C at a rate of 16° C/min. When the temperature in the furnace became constant one hour after the temperature elevation, the furnace was held at the temperature of 1,000 degrees C for eight hours, and, thereafter, the substrate was successively moved into the second heat diffusion furnace held at 600 degrees C. After this, the electric conduction to the second diffusion furnace was stopped, and the furnace was left to cool from 600 degrees C back to the room temperature. After the external diffusion process of $Li_2O$, the same process steps as in the first embodiment were followed in sequence, i.e., formation of the comb-shaped electrodes, and proton exchange.

The thus fabricated light waveguide was examined for its characteristics under the same conditions as in the first embodiment, from which it was found that the light propagation loss was 1.0 dB/cm and the diffraction efficiency was 60%.

Figure 7:
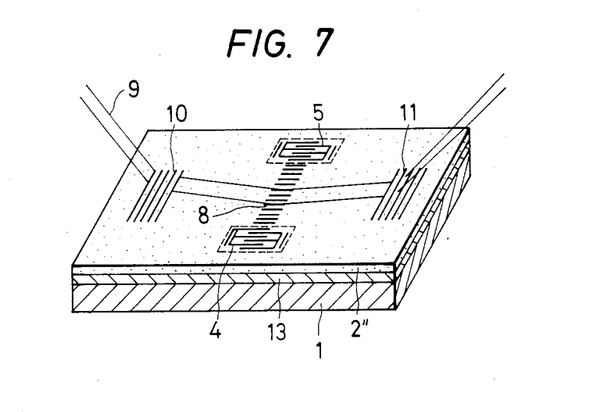

FIG. 7 illustrates a sixth embodiment of the present invention, which is a further improvement in the aforedescribed fourth embodiment. In the drawing, a reference numeral 13 designates a titanium diffused layer, and a numeral 2" refers to an ion-exchanged section where proton have been injected into the titanium diffused layer. The remaining parts are identical with those in the light function element shown in FIG. 6, hence they are designated by the same reference numerals. The light function element in this sixth embodiment has its advantage of lower light propagation loss than that in the fifth embodiment In the manufacture of the optical function element according to this sixth embodiment of the present invention, the following process steps were carried out after the cleaning of the substrate. That is to say, a thin film of titanium having a thickness of 200 angstroms was formed on the dried surface of the substrate by the electron beam deposition. Subsequently, the substrate was erected on a molten quartz holder, and then it was set in a heat diffusion furnace kept at 965 degrees C. Dried oxygen gas ($O_2$) was introduced into the diffusion furnace as the atmospheric gas at a rate of 1 lit/min. The temperature in the furnace was raised from room temperature to 965 degrees C at a rate of 16 degrees C/min. When the furnace temperature became constant one hour after the temperature elevation, the holder was maintained at 965 degrees C for 2.5 hours. Thereafter, it was successively moved to the second heat diffusion furnace kept at 600 degrees C. Then, the electric conduction to the second diffusion furnace was stopped, and the furnace was left to cool from 600 degrees C back to room temperature. After the heat diffusion treatment of titanium, the same procedures as in the fourth embodiment in FIG. 4 were followed sequentially, i.e., formation of the comb-shaped electrodes and proton exchange. With a view to examining the characteristics of the thus fabricated optical waveguide, He-Ne laser beam having a wavelength of 6328 angstroms was introduced by a rutile prism into the waveguide surface in its y direction to measure the light propagation loss. A value of 0.2 dB/cm was obtained. The threshold value of the optical damage was as high a value as 15 mW/mm in spite of its having the titanium diffusion layer. On the other hand, the measured value of the diffraction efficiency was 70%, which is higher than that in the fourth and sixth embodiments.

Figure 8:
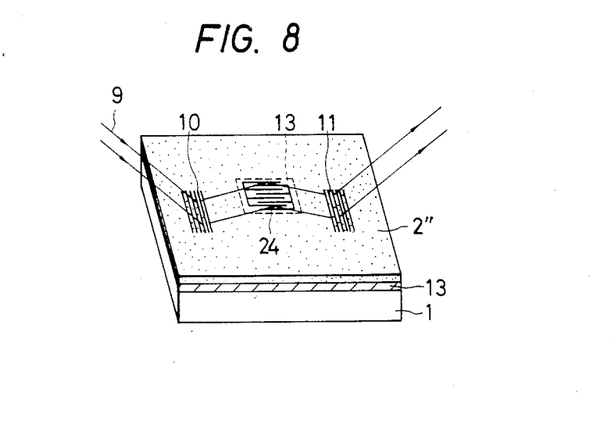

FIG. 8 is a schematic perspective view showing the optical function element according to the seventh embodiment of the present invention, in which the electrooptical effect is used. In the drawing, a reference numeral 1 designates a crystal substrate of LiNbO$_3$, a numeral 2" refers to an ion-exchanged section where protons have been injected into a titanium diffused layer, 13 represents the titanium diffused layer where titanium has been heat-diffused; 10 and 11 represent diffraction grating type light couplers for input and output, respectively; and 9 denotes a laser beam. In this seventh embodiment, the laser beam 9 is introduced into the optical waveguide from the diffraction grating type light coupler 10. The guided beam is diffracted by the phase lattice produced from the electro-optical effect upon application of a voltage to the comb-shaped electrode 24, and is taken outside from the output diffraction grating type light coupler 11. The element shown in FIG. 8 is fabricated by the following process steps.

One surface part (for example x+ surface) of LiNbO$_3$ crystal of an X-plate (having a thickness of 1 mm in the x direction, and a length of 1 inch in the z and y directions) was polished to a degree of flatness of a few less Newton rings, after which the substrate was cleaned by ordinary ultra-sonic cleaning with use of methanol, acetone, and pure water, followed by drying the surface by blowing nitrogen gas against it.

Then, a thin film of titanium having a thickness of 200 angstroms was formed on the washed and dried surface of the substrate by the electron beam deposition. Subsequently, the substrate was erected on a molten quartz holder, and then it was set in a thermal diffusion furnace kept at 965 degrees C. Dried oxygen gas ($O_2$) was introduced into the diffusion furnace as the atmospheric gas at a flow rate of 1 lit/min. The temperature in the furnace was raised from room temperature to 965 degrees C at a rate of 16 degrees C./min. When the furnace temperature became constant one hour after the temperature elevation, the holder was maintained at 965 degrees C. for 2.5 hours. Thereafter, it was successively moved to the second heat diffusion furnace kept at 600 degrees C. Then, the electric conduction to the second diffusion furnace was interrupted and the furnace was left to cool from 600 degrees C. back to the room temperature, thereby forming the titanium diffusion layer 13 on the crystal substrate 1. The metal to be heated-diffused may be selected from V, Ni, Au, Ag, Co, Nb, Ge, and so forth.

Next, following the titanium diffusion, the substrate was cleaned and dried. Thereafter, a positive photoresist was coated on the substrate by means of a spinner to a thickness of 1 to 1.5 μm, and then contact exposure was effected thereon by use of a negative mask of the comb-shaped electrode, followed by development of the same in a manner not to leave the comb-shaped electrode section alone. After the washing, the substrate was dried and loaded on a vacuum deposition device which was evacuated to the vacuum degree of $1 \times 10^{-6}$ Torr, and then aluminum was deposited thereon by the electron beam deposition to a film thickness of 1,500λ. Following the vapor-deposition, the substrate was immersed in acetone for several minutes to remove the aluminum film on the photo-resist by lifting-off and to form the comb-shaped electrode portion alone on the substrate. In this case, the comb-shaped electrode is so designed that it has the electrode width and the space interval between the electrodes set at 2.2 μm, a crossing width of 3.8 mm, and a number of pairs of 350 pairs. The crystal substrate, on which the comb-shaped electrode 24 had been formed, was subjected to the ion-exchange process. 98.85 g of benzoic acid ($C_6H_5COOH$) and 1.05 g of lithium benzoate ($C_6H_5COOLi$) were uniformly mixed, and put in a crucible of alumina. Into this crucible, the abovementioned crystal substrate with electrodes was placed, and then the crucible and the substrate were maintained in a hot furnace at 250 degrees C for one hour. By this process, proton were injected into the portion of the crystal substrate 1, where no comb-shaped electrode 24 had been formed, and the ion-exchanged section 2" was formed.

In the formation of this ion-exchanged section 2", it is desirable to use a mixture of carboxylic acid having its degree of dissociation ranging from $10^{-6}$ to $10^{-3}$ and a substance with the hydrogen atom in the carboxylic acid group thereof having been replaced by lithium (e.g., lithium salt of carboxylic acid) as a mixture of benzoic acid and lithium benzoate. Examples are a mixture of palmitic acid [$CH_3(CH_2)_{14}COOH$] and lithium palmitate [$CH_3(CH_2)_{14}COOLi$]; and a mixture of stearic acid [$CH_3(CH_2)_{16}COOH$] and lithium stearate [$CH_3(CH_2)_{16}COOLi$]. In this case, lithium salt of carboxylic acid should desirably be mixed at a molar ratio of from 0.1% to 3% with respect to the whole mixture. After the ion-exchanging process, the substrate was taken outside by use of a quartz tool for holding the substrate, followed by cleaning the same with ethanol, and then with acetone. With these solvents, crystals of benzoic acid and lithium benzoate adhered onto the substrate can be readily dissolved.

When an electric potential of 6V was imparted to the comb-shaped electrode 24 of the electro-optical element fabricated in the abovementioned process steps to diffract the guided light beam, there could be obtained a diffraction ratio of 90%. Thus, even in the optical function element using the electro-optical (EO) effect, (formation of the electrodes at a portion where no ion-exchange process has been effected would prevent the electro-optical effect of the crystal from lowering, and the element is able to function with high efficiency. Such electro-optical element can be formed not only by the above-described method, but also by the same process steps as that of the element shown in FIGS. 4 and 5.

In the above-described seventh embodiment of the present invention, the light waveguide was fabricated by the ion-exchange process. Further, by heat-diffusion of protons which have been injected into the substrate by the ion-exchange process, there can be obtained an optical function element exhibiting a higher threshold value for optical damage. This will be explained in the following.

Figure 9:
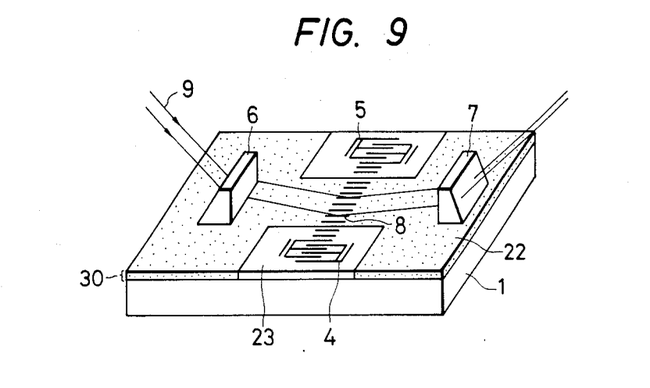

FIG. 9 illustrates an eighth embodiment of the light function element according to the present invention, in which the element is a thin film acousto-optical (AO) element. In the drawing, a reference numeral 1 designates a crystal substrate of $LiNbo_3$; a numeral 22 refers to a proton diffused section formed by heat diffusion of titanium and proton; a numeral 23 represents a proton-non-diffused section where titanium alone has been heat diffused; 4 denotes a comb-shaped electrode at the emission side; 5 a comb-shaped electrode at the receiving side; 6 an input prism light coupler; 7 an output prism light coupler; 8 elastic surface waves; 9 a laser beam; and 30 an optical waveguide layer formed on the surface of the crystal substrate 1. The laser 9 is guided into the optical waveguide layer 10 from the prism light coupler 6, and is diffracted by the elastic surface waves 8 generated upon application of radio frequency (RF) power to the comb-shaped electrode. The diffracted light is taken outside by the prism light coupler 7. In this eighth embodiment of the present invention, since the comb-shaped electrodes 4 and 5 are provided on the proton-non-diffused section 23, the efficiency in the generation of the elastic surface waves 8 is high; and, also, since the optical waveguide layer is formed by the heat-diffusion of titanium and proton, the threshold value of the optical damage is characteristically high, hence the element is excellent as the optical function element.

In the following, one example of the fabrication method of the optical function element according to the eighth embodiment of the present invention will be explained in detail in reference to FIGS. 10A through 10D.

Figure 10A:
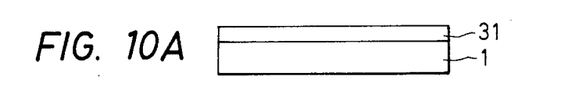
FIGS. 10A to 10D are schematic cross-sections showing one example of a fabricating process of the optical function element of the embodiment shown in FIG. 9.

One surface part (for example, X+ surface) of $LiNbO_3$ crystal substrate 1 of an X-plate (having a thickness of 1 mm in the x direction, and a length of 1 inch in the z and y direction) was polished to a degree of flatness of a few less Newton rings, after which the substrate was cleaned by ordinary ultra-sonic cleaning with use of methanol, acetone, and pure water, followed by drying the surface by blowing nitrogen gas against it.

Then, a thin film of titanium having a thickness of 200 angstroms was formed on the thus cleaned and dried surface of the substrate by the electron beam deposition. Subsequently, the substrate was erected on a molten quartz holder, and then it was set in a heat diffusion furnace kept at 965 degrees C. Dried oxygen gas ($O_2$) was introduced into the diffusion furnace as the atmospheric gas at a flow rate of 1 lit/min. Then, the temperature in the furnace was raised from room temperature to 965 degrees C at a rate of 16 degrees C/min. When the furnace temperature became constant one hour after the temperature elevation, the holder was maintained at 965 degrees C for 2.5 hours. Thereafter, it was successively transferred to the second heat diffusion furnace kept at 600 degrees C. Then, the electric conduction to the second diffusion furnace was interrupted, and the furnace was left to cool from 600 degrees C back to room temperature, thereby forming the titanium diffused layer 31 on the crystal substrate 1 as shown in FIG. 10A. For the metal to be heat-diffused, there may be used V, Ni, Au, Ag, Co, Nb, Ge, and so forth.

Figure 10B:
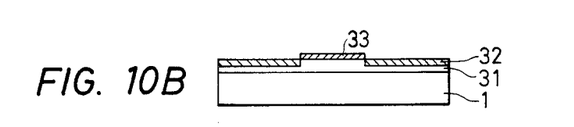

In the next place, an aluminum plate 1 mm thick and in a shape conforming to the portion to be proton-exchanged was placed on the abovementioned crystal substrate, on which chromium and then aluminum were deposited by electron beam deposition to the respective thicknesses of 50 angstroms and 1,450 angstroms. With these chromium-aluminum thin films, a masking 33 as shown in FIG. 10B was formed on the crystal substrate 1. Then, the ion-exchanging process was carried out to this crystal substrate, on which the masking 33 had been formed. Here, 98.85 g of benzoic acid ($C_6H_5COOH$) and 1.05 g of lithium benzoate ($C_6H_5COOLi$) were uniformly mixed, and put in a crucible of alumina. Into this crucible, the abovementioned crystal substrate with the masking was placed, and then the crucible and the substrate were maintained in a hot furnace at 250 degrees C for one hour. By this process, protons were injected into the portion of the crystal substrate, where no masking 33 had been formed, and the ion-exchanged section 32 was thus formed. In the formation of this ion-exchanged section 32, it is preferable to use a mixture of carboxylic acid having its degree of dissociation ranging from $10^{-6}$ to $10^{-3}$ and a material, with the hydrogen atom in the carboxylic acid thereof having been substituted for lithium (e.g., lithium salt of carboxylic acid) as a mixture of benzoic acid and lithium benzoate. Examples of such mixture are as enumerated in the preceding seventh embodiment. After the ion-exchanging process, the substrate was taken outside by use of a quartz tool for holding the substrate, followed by cleaning the same with ethanol, and then with acetone. With these solvents, crystals of benzoic acid and lithium benzoate adhered onto the substrate can be readily dissolved. After the washing, the masking 33 made up of the protective thin films of chromium and aluminum for the ion-exchanging process was removed with etching solution.

Figure 10C:
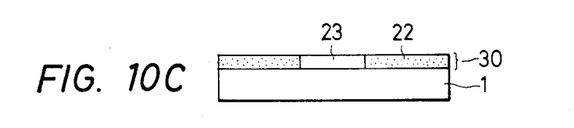

Subsequently, the abovementioned substrate was placed in a hot furnace and subjected to annealing treatment at 350 degrees C for two hours in a wet oxygen atmosphere containing water vapor which was produced by supplying oxygen at a flow rate of 0.5 lit/min. through heated water passed into the hot furnace. As the result of this, the proton as injected was heat-diffused in the substrate by the ion-exchanging process, whereby there were formed on the crystal substrate 1 the proton diffused section where titanium and proton had been heat-diffused, and the proton-non-diffused section 23 where titanium alone had been heat-diffused.

After the annealing, the infrared absorption spectrum of the substrate was measured. The result revealed that the degree of light absorption in the vicinity of 3,500 $cm^{-1}$ owing to OH group was 0.4, which was not very much different from the value of 0.38 prior to the annealing treatment. On the other a difference between the propagation constant of the TE mode (in the case of X-plate crystal, the propagating direction is y, while, in the case of Y-plate crystal, the propagating direction is x) and the refractive index of the substrate was 0.11 prior to the annealing, which was decreased to 0.06 after the annealing. Combining the results of the light absorption by OH group and the propagation constant, as described in the preceding, it was verified that the total quantity of protons in the crystal did not change very much by the annealing, and proton were diffused in the interior of the crystal.

Figure 10D:
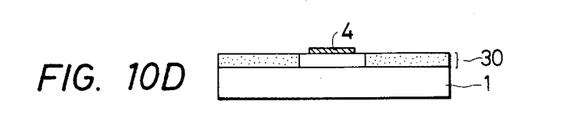

After the annealing, the comb-shaped electrode 4 having the principal frequency of 400 MHz was formed on the proton-non-diffused section 23 of the substrate by means of the ordinary photo-lithographic method, as shown in FIG. 10D.

When radio-frequency power of 400 MHz was applied to the comb-shaped electrode 4 of the thus fabricated thin film type optical element according to the present invention, and then light having a wavelength of 6328 angstroms was guided into the element to examine the diffraction efficiency of this guided light, it was found to be 80% when the radio frequency power was 600 mW.

On the other hand, the insertion loss of the elastic surface waves measured by the comb-shaped electrode 5 at the receiving side was 15 dB in the case of the element according to this eighth embodiment, which was considerably smaller than the value of 40 dB in the case of the comb-shaped electrode provided at the proton diffused section.

Further, measurement of the threshold value of the optical damage was conducted on both optical function elements of this embodiment and of the conventional art having the titanium-diffused $LiNbO_3$ light waveguide. The laser beam used for the measurement was He-Ne laser having its wavelength of 6328 angstroms. In the case of the conventional light function element, when power of the emitting light reaches 0.1 mW/mm and above, there occurred the optical damage. In contrast to this, the light function element of the present invention did not show any optical damage until the power of the emitting light reached 1.7 mW/mm.

Figure 11:
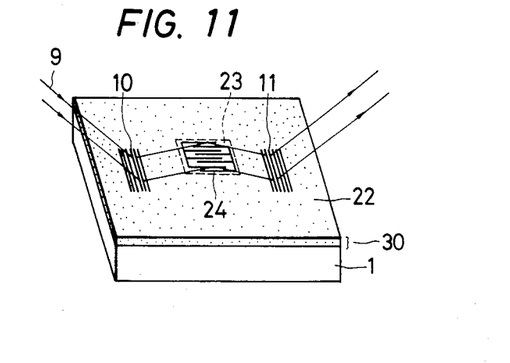
FIG. 11 is a perspective view showing a further example of the optical function element according to the present invention.

FIG. 11 is a perspective view of the optical function element according to a ninth embodiment of the present invention, wherein the structure as shown in FIG. 9 is applied to a light deflector utilizing to electro-optical (EO) effect. In the drawing, a reference numeral 1 designates a crystal substrate of $LiNbO_3$; a numeral 22 refers to a proton diffused section where titanium and proton are heat-diffused; a numeral 23 represents a proton-non-diffused section where titanium alone is heat diffused; 24 denotes a comb-shaped electrode for the electro-optical effect; 10 and 11 indicate respectively input and output diffraction grating type light couplers; 9 a laser beam; and 30 a light waveguide layer formed on the surface of the crystal substrate 1. In this ninth embodiment of the present invention, the proton-non-diffused section 23 is formed only beneath the comb-shaped electrode. The laser beam 9 is guided into the optical waveguide layer 30 from the diffraction grating type light coupler 10. This guided beam is diffracted by a phase lattice produced from the electro-optical effect upon application of a voltage to the comb-shaped electrode 24, and then is taken outside from the diffraction grating type light coupler 11.

In the following, one example of the fabrication method of the optical function element in this ninth embodiment will be described in detail in reference to FIGS. 12A to 12C.

Figure 12A:
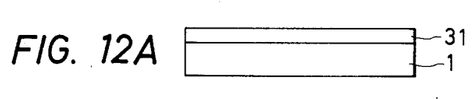
FIGS. 12A to 12C are schematic cross-sections showing one example of a fabricating process of the optical function element of the embodiment shown in FIG. 11.
Figure 12B:
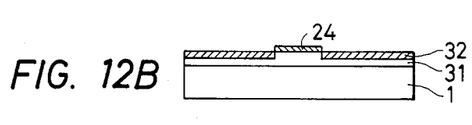
Figure 12C:
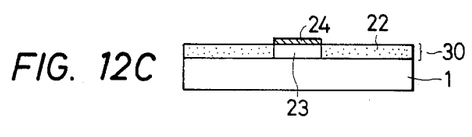

First of all, the titanium diffused layer 31 was formed on the $LiNbO_3$ crystal substrate 1, as shown in FIG. 12A, in exactly the same manner as in the eighth embodiment.

Subsequently, the substrate, after the titanium diffusion, was cleaned and dried, and then a positive photoresist was coated thereon to a thickness of 1 to 1.5 μm by means of a spinner, and then contact exposure was effected thereon by use of a negative mask of the comb-shaped electrode, followed by development of the same in a manner such that only the comb-shaped electrode may not remain therein. After washing, the substrate was dried and loaded on a vacuum deposition device which was evacuated to the vacuum degree of $1 \times 10^{-6}$ Torr, and then aluminum was deposited thereon by the electron beam deposition to a film thickness of 1,500 angstroms. Following the vapor-deposition, the substrate was immersed in acetone for several minutes to remove the aluminum film on the photoresist by lifting-off and to form the comb-shaped electrode portion 24 alone on the substrate. In this case, the comb-shaped electrode was so designed that it had the electrode width and the space interval between the electrodes set at 2.2 μm, a crossing width of 3.8 mm, and a number of pair of 350 pairs.

The crystal substrate, on which the comb-shaped electrode 24 had been formed, was subjected to the proton-exchange process. In this case, the substrate was heat-treated in a mixture of benzoic acid and lithium benzoate, through the exactly same process steps as in the eighth embodiment, whereby proton were injected into the portion where no electrode had been formed, as shown in FIG. 12B, and the ion-exchanged layer 32 was thus formed. In this embodiment, too, various materials may be selectively used for the proton-exchange process as in the eighth embodiment.

Subsequently, the abovementioned substrate was placed in a hot furnace, and subjected to annealing treatment at 350 degrees C for two hours in a wet oxygen atmosphere containing water vapor which was produced by supplying oxygen at a flow rate of 0.5 lit/min. through heated water passed into the hot furnace. As the result of this, the proton as injected was heat-diffused in the substrate at the portion thereof where no bomb-shaped electrode had been formed, whereby there were formed on the crystal substrate 1 the proton diffused section 22, in which titanium and proton had been diffused, and the proton-non-diffused section 23, in which titanium alone had been heat-diffused. In the course of this annealing process, there occurred no problem of oxidation, etc. because the comb-shaped electrode 24 was manufactured with gold. In a case as in the present embodiment, since the electrode function as the mask for the proton injection, the process for its fabrication is simplified.

After the annealing, an electric potential of 6 volts was applied to the comb-shaped electrode 24 of the thus fabricate electro-optical element to cause the guided wave to diffract. A diffraction efficiency of 90% was obtained.

The present invention, not limited to the afore-described various embodiments thereof, is capable of various applications. For instance, in the foregoing embodiments, LiNbO₃ crystal was used as the substrate, but it is also possible to form the optical function element of the present invention, in exactly the same method of fabrication as mentioned in the foregoing, even with use of a lithium tantalate (LiTaO₃) crystal substrate. It is further possible that a light modulator can be constructed in the same manner as in the foregoing embodiments. Furthermore, the light modulation and the light deflection can also be effected not only by the afore-described acousto-optical effect or electro-optical effect, but also by diffraction of magnetostatic surface waves produced from the magneto-optical effect or by the thermo-optical effect. Moreover, the fabrication method of the present invention is capable of various applications: for example, if the material is such one that does not modify itself during the annealing process in the fabrication steps of the abovementioned eighth embodiment, the comb-shaped electrode can be formed prior to the annealing process. The optical function element according to the present invention can be suitably used for various apparatuses and appliances such as, for example, photo-scanning device, spectrum analyzer, correlator, and so forth.

What I claim is:

1. In an optical function element comprising a substrate having a surface, a thin film optical waveguide formed by ion-exchange on a region of said surface of said substrate, and means for effecting one of modulation and deflection of light propagating in the optical waveguide by an electric field applied to defract light in the optical waveguide, wherein the improvement comprises said means for effecting one of modulation and deflection being provided at another region of said surface of said substrate than said region where said waveguide is formed.

2. In an optical function element according to claim 1, wherein said substrate is made of lithium niobate crystal or lithium tantalate crystal.

3. In an optical function element according to claim 2, wherein the surface of said substrate has titanium diffused over the entire surface thereof.

4. In an optical function element according to claim 2, wherein the surface of said substrate has lithium oxide diffused externally over the entire surface thereof.

5. In an optical function element according to claim 1, wherein said means includes comb-shaped electrodes which generate elastic surface waves on the surface of said substrate by the acousto-optical effect.

6. In an optical function element according to claim 1, wherein said means includes comb-shaped electrodes which generate a periodical refractive index distribution on said substrate by the electro-optical effect.

7. In an optical function element according to claim 9, wherein said substrate is made of lithium niobate crystal or lithium tantalate crystal.

8. In an optical function element according to claim 7, wherein said metal is titanium.

9. In an optical function element comprising a substrate having a surface, a thin-film optical waveguide formed by proton diffusion on a region of said surface of said substrate, and means for effecting one of modulation and deflection of light propagating in said optical waveguide by an electric field applied to diffract light in the optical waveguide, wherein the improvement comprises a metal being diffused over the entire surface of said substrate and said means for effecting one of modulation and deflection being provided at another region of said surface of said substrate than said region where said waveguide is formed.

10. In an optical function element according to claim 9, wherein said means includes comb-shaped electrodes which generates surface waves on the surface of said substrate by the acousto-optical effect.

11. In an optical function element according to claim 9, wherein said means includes comb-shaped electrodes which generate a periodical refractive index distribution on said substrate by the electro-optical effect.

12. A method for producing an optical function element, which comprises the steps of:
   forming a mask on one region of a surface of a substrate made of one of lithium niobate crystal and lithium tantalate crystal;
   effecting an ion exchange process on said surface of said substrate with said mask formed thereon to inject protons into another region of said substrate than said one region; and
   forming an electrode on said one region.

13. A method according to claim 12, further comprising the step of thermal-diffusing a metal over all of said surface of said substrate prior to formation of the mask.

14. A method according to claim 13, further comprising the step of thermal-diffusing said injected protons in said another region.

15. A method according to claim 12, further comprising the step of externally diffusing lithium oxide (Li₂O) over all of said surface of said substrate prior to formation of the mask.

16. A method according to claim 12, wherein said ion-exchange process is effected by subjecting said substrate to low temperature heat-treatment in a mixture of carboxylic acid having a degree of dissociation ranging from $10^{-6}$ to $10^{-3}$ and a lithium salt of said carboxylic acid.

17. A method according to claim 16, wherein said lithium salt of carboxylic acid is mixed at a molar ratio of from 0.1% to 3% with respect to the total quantity of the mixture.

18. A method for producing an optical function element, which comprises steps of:
   (a) forming electrodes on one region of the surface of a substrate made of either lithium niobate or lithium tantalate; and
   (b) effecting ion-exchange process on the surface of said substrate with the electrodes formed thereon to inject proton into said substrate at a region not covered with the electrodes.

19. A method for fabricating a light function element according to claim 18, further comprising step of thermal-diffusing metal over the entire surface of said substrate prior to formation of the electrodes.

20. A method for producing an optical function element according to claim 19, further comprising step of thermal-diffusing said injected proton in said substrate.

21. A method according to claim 18, further comprising step of externally diffusing lithium oxide ($Li_2O$) over the entire surface of said substrate prior to formation of the electrodes.

22. A method according to claim 18, wherein said ion-exchange process is effected by subjecting said substrate to low temperature heat-treatment in a mixture of carboxylic acid having degree of dissociation ranging from $10^{-6}$ to $10^{-3}$ and a lithium salt of said carboxylic acid.

23. A method according to claim 22, wherein said lithium salt of carboxylic acid is mixed at a molar ratio of from 0.1% to 3% with respect to the total quantity of the mixture.

* * * * *

UNITED STATES PATENT AND TRADEMARK OFFICE
CERTIFICATE OF CORRECTION

PATENT NO. : 4,799,750
DATED : January 24, 1989
INVENTOR(S) : MAMORU MIYAWAKI

It is certified that error appears in the above-identified patent and that said Letters Patent is hereby corrected as shown below:

AT [56] REFERENCES CITED

Other Publications, "Convertor" should read --Converter--.
Other Publications, "Thichnes" should read --Thickness-- and "by Ap-" should read --by J. Kushibiki et. al., Ap- --.
Other Publications, "Zno-Film" should read --ZnO-Film--.
Other Publications, "Russo" should read --Gia Russo--.

COLUMN 1

Line 41, "is meant" should read --means--.

COLUMN 2

Line 30, "tallium nitrate (TlNO$_3$)," should read --thallium nitrate (TlNO$_3$),--.

COLUMN 4

Line 1, "benzoic acid (C$_6$H$_5$COO)" should read --benzoic acid (C$_6$H$_5$COOH)--.

COLUMN 6

Line 9, "diffusinn" should read --diffusion--.

UNITED STATES PATENT AND TRADEMARK OFFICE
CERTIFICATE OF CORRECTION

PATENT NO. : 4,799,750

DATED : January 24, 1989

INVENTOR(S) : MAMORU MIYAWAKI

It is certified that error appears in the above-identified patent and that said Letters Patent is hereby corrected as shown below:

COLUMN 7

Line 30, "fabrication" should read --fabricating--.
      Line 37, "methanol" should read --methanol,--.

COLUMN 8 line 16, "He-Ne" should read --a He-Ne--.
      Line 30, "identical as" should be deleted.

COLUMN 9

Line 13, "proton" should read --protons--.
      Line 46, "He-Ne" should read --a He-Ne--.

COLUMN 10

Line 9, "few less" should read --few or less--.
      Line 63, "proton" should read --protons--.

COLUMN 11

Line 23, "(for-" should read --for- --.
      Line 44, "LiNbo$_3$;" should read --LiNbO$_3$;--.

COLUMN 12

Line 10, "few less" should read --few or less--.
      Line 49, "crubible" should read --crucible--.

UNITED STATES PATENT AND TRADEMARK OFFICE
CERTIFICATE OF CORRECTION

PATENT NO. : 4,799,750
DATED : January 24, 1989
INVENTOR(S) : MAMORU MIYAWAKI

It is certified that error appears in the above-identified patent and that said Letters Patent is hereby corrected as shown below:

COLUMN 13

Line 31, "proton" should read --protons--.
    Line 68, "to" (second occurrence) should read --the--.

COLUMN 14

Line 4, "proton" should read --protons--.
    Line 54, "proton" should read --protons--.
    Line 68, "bomb-shaped" should read --comb-shaped--.

COLUMN 15

Line 9, "function" should read --functions--.
    Line 13, "fabricate" should read --fabricated--.

COLUMN 16

Lines 3,6,8, Renumber Claims 7, 8 and 9 as
        Claims 8, 9 and 7.
    Line 22, "generates" should read --generate--.
    Line 58 - Column 17 line 10, rewrite claims 18, 19,
        20, and 21 as follows:
        18. A method for producing an optical function
        element, which comprises the steps of:
            forming an electrode on one region of a
    surface of a substrate made of one of lithium
    niobate and lithium tantalate; and
        effecting an ion-exchange process on said
    surface of said substrate to inject protons into
    another region of said surface of said substrate
    than said one region.

UNITED STATES PATENT AND TRADEMARK OFFICE
CERTIFICATE OF CORRECTION

PATENT NO. : 4,799,750
DATED : January 24, 1989
INVENTOR(S) : MAMORU MIYAWAKI

Page 4 of 4

It is certified that error appears in the above-identified patent and that said Letters Patent is hereby corrected as shown below:

COLUMN 16 (Cont'd.)

19. A method for fabricating a light function element according to Claim 18, further comprising the step of thermal-diffusing metal over all of said surface of said substrate prior to formation of the electrode.
20. A method for producing an optical function element according to Claim 19, further comprising the step of thermal-diffusing said injected protons in said another region.
21. A method according to Claim 18, further comprising the step of externally difussing lithium oxide ($Li_2O$) over all of said surface of said substrate prior to formation of the electrode.

COLUMN 18

Line 4, "degree" should read --a degree--

Signed and Sealed this

Tenth Day of April, 1990

*Attest:*

HARRY F. MANBECK, JR.

*Attesting Officer*  *Commissioner of Patents and Trademarks*